Sept. 26, 1961             E. F. MACKS             3,001,609

FLUID SUPPORTED DEVICE

Filed March 30, 1956                                         2 Sheets-Sheet 1

INVENTOR.
ELMER FRED MACKS
BY Pyle and Fisher
HIS ATTORNEYS

INVENTOR.
ELMER FRED MACKS
BY Pyle and Fisher
HIS ATTORNEYS

United States Patent Office 3,001,609
Patented Sept. 26, 1961

3,001,609
FLUID SUPPORTED DEVICE
Elmer Fred Macks, Willow Lane, Vermilion, Ohio
Filed Mar. 30, 1956, Ser. No. 575,185
10 Claims. (Cl. 184—18)

This invention relates to mechanism having an element movable relative to another element in close surface-to-surface relationship, and more particularly to means for providing an effective lubricating film between the opposing surfaces of such elements to reduce friction and wear.

In the mechanical arts, there are many instances where one element moves or slides relative to another element in close surface-to-surface relationship. Typical examples of these are the mechanisms of various types of engines, pumps, compressors and projectiles. Under such conditions, some method must generally be provided for lubricating the opposing surfaces of the elements in order to reduce friction and wear of the confronting parts.

In the past this has usually been accomplished by the use of some type of liquid lubricant. Many times these devices have proven unsatisfactory. Under some conditions, such as extremes of temperature, it is almost impossible to provide adequate lubrication with previously known arrangements.

The present invention provides novel lubricating means for a mechanism in which an element moves relative to another element in close surface-to-surface relationship. This novel lubricating means is especially suitable for elements which are relatively movable linearly.

More specifically, in the principal embodiments disclosed herein, the movable element is provided with fluid accumulating means, such as a chamber portion, in communication with a foraminous section defining an extremity of the movable element, and means for supply fluid under pressure to the fluid accumulating means whereby the fluid flows through the foraminous section to provide an effective lubricating film between the relatively moving parts.

The means for supplying fluid under pressure to the accumulating means may comprise any suitable arrangement such as pressurizing fluid in the accumulating chamber by the movement of the movable element in a volume of fluid medium defined by the associated guiding member. Other examples of suitable means for supplying fluid under pressure are completely separate mechanical means such as a pump device and an inherently pressurizing chemical reaction such as an explosion. As used in this disclosure the term "foraminous accumulator" is used to designate a part of the mechanism; it will be understood that the member referred to is the movable element. The invention is particularly applicable for providing a film of gaseous fluid lubrication between relatively moving parts, although it may also be used in connection with other types of fluids.

In the copending application for patent Serial No. 433,946, filed June 2, 1954, entitled "Method and Apparatus for Providing Mobility," now abandoned in favor of continuation-in-part application for patent Serial Number 737,969, filed May 26, 1958, under the same title, the broad principles of a self supporting and lubricating mechanism have been disclosed. The present invention contemplates the employment of the basic principles disclosed in that application in a moving accumulator which is carried in a confinement guide.

The confinement guide has a guide surface for directing the relative movement of the fluid accumulator. In its preferred form the moving accumulator has a foraminous wall with an outer surface. The outer surface confronts the guide surface in close spaced relationship.

In operation, fluid under pressure is introduced into a chamber in the accumulator member. The fluid then passes through the foraminous wall and forms a thin film of fluid under pressure between the wall outer surface and the guide surface.

The film consists of a moving fluid which is constantly escaping at either end of the area of confrontation. The film is constantly being replenished by a fresh supply of fluid which passes through the foraminous wall.

As fluid under pressure is passed through a restriction, a pressure drop is experienced. This pressure drop is proportional to the flow of fluid. The greater the flow the greater the pressure drop, and, conversely, the lower the fluid flow the lower the pressure drop.

The restriction orifices in the foraminous wall are so located as to provide an inherently self-centering and self-stabilizing effect. In some cases the foraminous wall surface may be covered with a multitude of such restriction orifices as in the case of sintered permeable materials, while in other cases the wall may contain only a few such restriction orifices carefully located so as to accomplish the intended objectives. The restriction orifices may be connected with shallow recesses or grooves in the foraminous wall support surfaces so as to effectively cover a larger area with one or more restriction orifices. Hence, as used in this application, the word "foraminous" is intended to include a permeable wall which will provide a load carrying film of fluid between the closely spaced surfaces through the mechanism of restricted flow through the wall.

Thus, when fluid is passed through the foraminous wall, a fluid film will be formed in the area of confrontation. Unless the forces exerted against the accumulator have a resultant which is axial, the accumulator will tend to move laterally toward a portion of the guide surface. This movement will reduce the space between the confronting surfaces and therefore the flow of fluid into and through this area will be decreased as well. As the flow decreases the pressure drop through the foraminous wall decreases and the mean film pressure increases. Conversely, on the opposite side of the moving accumulator, the mean pressure will be relatively low since the space in the area of confrontation, the fluid flow and the pressure drop have all been increased. It will thus be seen that the relative movement of the accumulator may be slightly eccentric with respect to the guide surface, but that the resultant of the pressure exerted by the fluid film is always a force tending to move the piston into a position where the axes of the accumulator and the guide are coincident.

Through this mechanism a supporting and lubricating fluid film is formed over the entire area of confrontation. Thus, the two members are able to move relatively without surface-to-surface contact.

It is, therefore, one of the principal objects of this invention to provide a mechanism in which a moving member may be wholly supported on a fluid film to substantially completely eliminate wear of the relatively moving parts.

In many applications such as a gas compressor, an internal combustion engine, or a valve, pressurized fluid is available in the operating mechanism. This fluid may be introduced under pressure into the foraminous accumulator to provide the lubricating means. The fluid need not be a lubricating oil but may be air, water, or other fluids which are not normally considered lubricants.

It is, then, an additional object of this invention to provide a mechanism wherein relatively moving parts may be lubricated without the addition of any special lubricating material. The cost of operation is thus materially reduced, the performance materially increased, and the likelihood of damage due to failure of the operator to lubricate the machine is completely eliminated.

Another object of this invention is to provide a mechanism having a member adapted for movement in close surface-to-surface relationship with respect to another member and novel means for providing an effective film of lubrication between the opposing surfaces of said members.

A further object of this invention is to provide a novel system utilizing gaseous fluid for lubricating elements of a mechanism that are relatively movable in close surface-to-surface relationship.

A more specific object of this invention is to provide a mechanism in which a member such as a foraminous accumulator is movable in close surface-to-surface relationship with respect to another member such as a guiding casing arrangement. The one member comprises a lubricant containing portion and a foraminous surface defining said portion, and the other of the members comprises a guideway defining the path of travel of the one member. The mechanism also has means for exerting a pressure on the lubricant in said lubricant containing portion of the first named member whereby the lubricant flows through said foraminous surface and provides a fluid film between the members to effectively reduce friction and eliminate wear occurring on the members when they are moved relatively.

Other objects and a fuller understanding of the invention may be had by referring to the following description and claims, taken in conjunction with the accompanying drawings, in which:

FIGURE 3 is a fragmentary diagrammatic sectional view on a reduced scale with respect to FIGURES 1 and 2 of a foraminous accumulator adapted for use as a piston in a free piston engine or the like;

Figure 5:
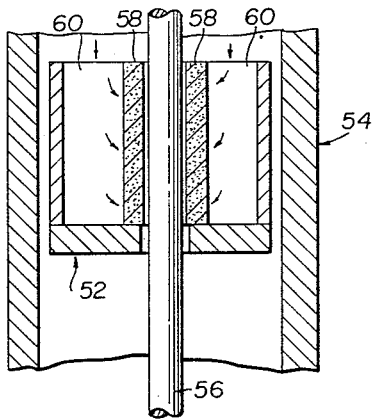
Figure 7:
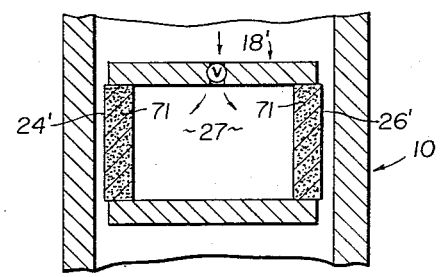
Figure 8:
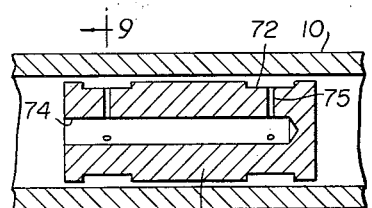
Figure 6:
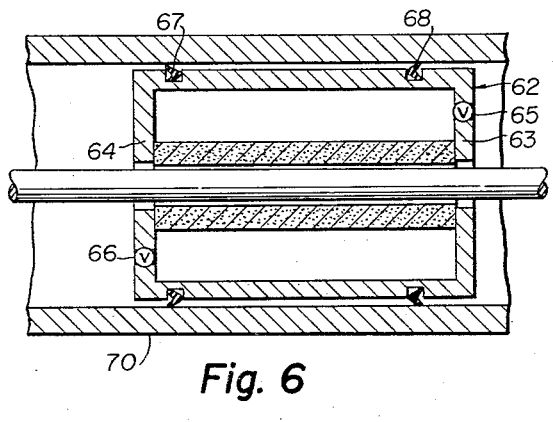
Figure 9:
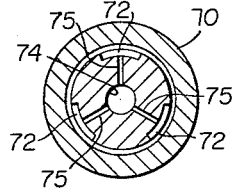

FIGURE 5 discloses a modified accumulator wherein the foraminous wall is disposed about and cooperates with an inner alignment guide;

FIGURE 6 is a fragmentary sectional view disclosing a modification wherein the moving accumulator is employed as a double acting piston with a check valve located in either end;

FIGURE 7 is a diagrammatic fragmentary sectional view disclosing a further modification of the invention wherein a solid or liquid lubricant is carried by the foraminous wall to provide instantaneous lubrication;

FIGURE 8 is a diagrammatic fragmentary sectional view disclosing a further modification wherein the foraminous wall takes the form of a plurality of spaced openings; and FIGURE 9 is a sectional view as seen from the plane indicated by line 9—9 of FIGURE 8.

Figure 1:
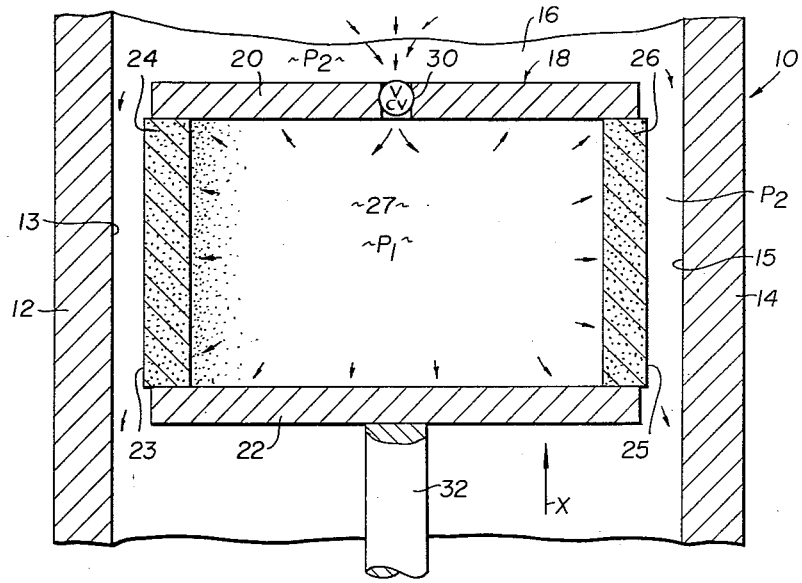
FIGURE 1 is a diagrammatic sectional view of a casing and foraminous accumulator arrangement embodying the invention. The clearances between the accumulator and the casing have been exaggerated for purpose of illustration.
Figure 2:
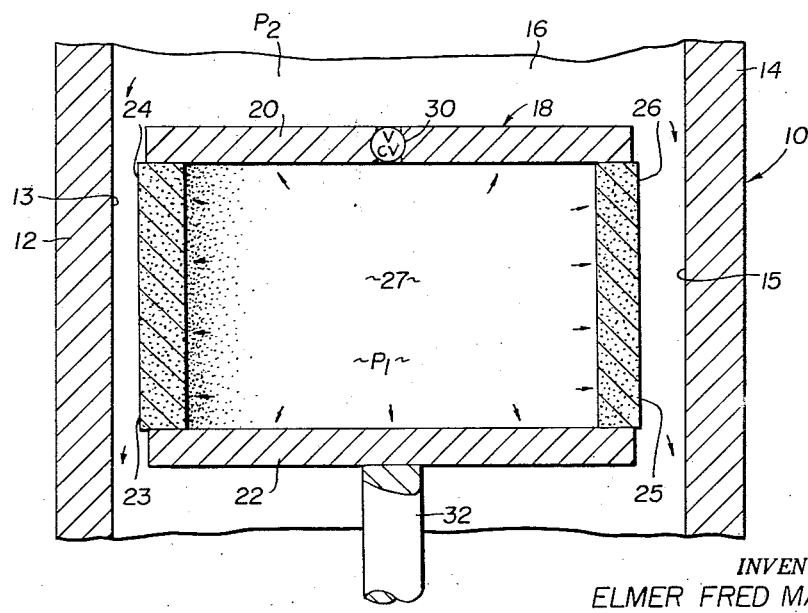
FIGURE 2 is a sectional view similar to FIGURE 1, illustrating possible lateral movement of the foraminous accumulator in the casing against the resistance of the film of lubricating fluid.

Referring to the drawings, and in particular to FIGURES 1 and 2 thereof, a guide member or casing 10 having enclosing walls 12, 14 is shown. The walls 12, 14 define a fluid containing cavity 16. The ends of the guide 10 may be open or they may be closed over, depending on the particular type of application in which the mechanism is to be employed.

An accumulator member 18 is disposed in the guide or casing 10 in close surface-to-surface relationship with inner surfaces 13, 15 of the walls 12, 14. In the embodiment shown the accumulator member is of piston-like configuration. It will be seen that the casing 10 forms a guideway defining the path of travel of the accumulator member 18. The guide member 10 and the accumulator member 18 need not be of circular cross sectional configuration.

The accumulator member 18 has top and bottom walls 20, 22. The accumulator member 18 also has side walls 24, 26. The walls define a chamber portion 27 which receives and accumulates fluid, as will be hereinafter described. The walls 24, 26 have outer surfaces 23, 25 respectively. For purposes of illustration, these surfaces 23, 25 have been shown spaced a considerable distance from the opposing guide surfaces 13, 15. It will be understood that in actual practice this spacing will generally be an extremely small dimension. In a piston and casing embodiment as shown, the spacing will usually be of the order of 0.0001 to 0.010 inch per inch of cross section. It is to be understood that this spacing is dependent upon fluid, speed, load and other conditions of the particular application.

The walls 24, 26 of the accumulator member 18 are formed of a foraminous material such as sintered metal or other material which is made permeable as by drilling carefully located restriction orifices. The foraminous walls 24, 26 provide restricted communication between the chamber portion 27 and the opposing surfaces 23, 13 and 25, 15.

A check valve 30 is carried by the top wall 20 of the accumulator member 18. The check valve 30 permits the flow of fluid therethrough from the fluid containing cavity 16. The valve 30 operates in only one direction. Thus, fluid that has entered the chamber 27 cannot move back through the valve 30 into the cavity 16.

In the embodiment shown, a piston rod 32 provides means for connecting the piston or foraminous accumulator to a crank shaft or the like. It will be understood, however, that any method of transmitting force to or from the accumulator member 18 may be used. Examples are fluid pressure, magnetic and electrical actuating arrangements, or a chemical reaction involving an explosive force. Such actuating means may exist on one or both end faces of the movable member 18.

When fluid is present in the cavity 16 under a pressure which exceeds the pressure of fluid in chamber 27, a flow of fluid occurs through the check valve 30. In the case of an air compressor, for example, this occurs when the piston is moving in the direction of arrow X, FIGURE 1. At this time the pressure $P_1$ in the chamber 27 increases as the pressure $P_2$ in the cavity 16 is being increased as fluid in that area is being compressed. If the accumulator member 18 is employed as a piston in an internal combustion engine, this fluid flow through the check valve 30 will occur both during the compression and the power strokes.

Thus, fluid under pressure is accumulated in the chamber portion. This trapped or accumulated pressurized fluid flows through the foraminous wall sections 24, 26 to provide a continuous lubricating film of fluid between the opposing surfaces 13, 23 and 15, 25. This film supports the accumulator 18 out of frictional surface-to-surface contact with guide member 10.

The rate of fluid flow through foraminous walls 24, 26 will depend in part upon the difference in pressure between the fluid in the chamber portion 27 and the fluid in the space between the accumulator and guide member surfaces 23, 13 and 25, 15 respectively. Accordingly, an adequate supply of lubricating fluid is insured under all operating conditions. The capacity of chamber 27 is such that a continuous lubricating film is produced between the surfaces 23, 25 and opposing surfaces 13, 15 even though fluid is not accumulated in the accumulator during all strokes of the accumulator.

Referring to FIGURE 2, as the accumulator 18 moves vertically with respect to the guide 10, it may also drift laterally toward one side. As the accumulator 18 approaches the opposing surface 13 of the guide, the space between the surfaces 13, 23 is reduced. This reduction in space results in an increase in the pressure of the fluid film in this space due to the decrease in the pressure drop through foraminous wall 24 caused by a reduction in fluid flow through wall 24. Conversely, the space between foraminous wall 26 of the piston and guide wall 14 of the casing increases as the piston drifts laterally to the left in FIGURE 2. This increase in clearance between surfaces 25, 15 results in a decrease in the pressure of the fluid film due to an increase in pressure drop through the foraminous wall 26 caused by an increase in fluid flow through foraminous wall 26. Thus the foraminous accumulator and associated guide surfaces constitute an inherent servo mechanism which holds the relatively moving members out of contact irrespective of load components normal to the guiding surfaces. A somewhat similar action occurs when the moving member tilts within the guide surface clearance.

Thus, the operation of the lubricating film producing mechanism is inherently automatic, tending to maintain the accumulator 18 spaced from and floating between the guide surface of the guide 10. Accordingly, an effective fluid lubricating film is always produced between the closely spaced relatively moving parts of the mechanism to eliminate frictional contact and resultant wear.

It will be understood that this lubricating and self-centering action occurs irrespective of whether the foraminous is adapted for relative linear or rotative movement in a vertical, horizontal or angular direction.

Figure 3:
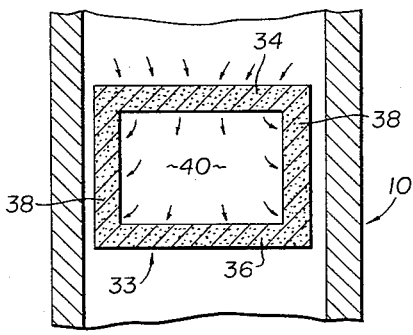

FIGURE 3 shows a modification of the invention wherein top and bottom walls 34, 36 of the foraminous accumulator, here indicated as 33, as well as side walls 38 thereof are formed of foraminous material. The fluid is accumulated in chamber portion 40 of the accumulator by passage of the fluid through the top and bottom walls 34, 36. It will be noted that in the arrangement shown in FIGURE 3 the chamber portion 40 may accumulate fluid during both the upward and downward strokes of the accumulator 33. If the accumulator 33 represented a mechanism having movement in only one direction, such as occurs in a projectile, only one end wall (either 34 or 36) would be effective in pressurizing the fluid. In such cases the opposite end wall would be solid to prevent fluid passage therethrough. The remainder of the action of the lubricating film producing mechanism of FIGURE 3 is substantially the same as the first described embodiment of the invention. The permeability of the top and bottom walls 34, 36 may be different from that of side walls 38.

Figure 4:
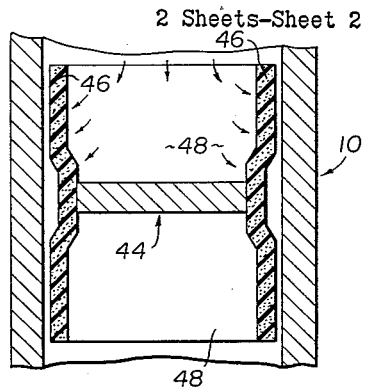
FIGURE 4 is a fragmentary diagrammatic sectional view on the scale of FIGURE 3 showing a modification of the invention wherein a distensible foraminous wall is employed.

FIGURE 4 shows another modification of the invention wherein the movable fluid accumulating member, here indicated as 44, has bearing walls 46 of a distensible foraminous structure such as a permeable plastic material. The ends of the accumulator 44 may be of open construction as shown and upon relative movement of the accumulator 44 in a vertical direction in the guide 10, fluid is accumulated under pressure in one or the other of chamber portions 48. The pressurized fluid distends the walls 46 outwardly toward the enclosing guide member 10 while at the same time fluid is forced through the porous structure of the walls to provide a fluid lubrication film between the members 44 and 10. The physical dimensions of the member 44 are thus automatically controlled by the pressure of the accumulated fluid in the chamber portions 48. Thus the member 44 is conformed to the guide 10 irrespective of irregularities in the guiding surfaces of the latter, and the lubricating film of fluid between the walls 46 and the guiding surfaces of the guide 10 are maintained, preventing surface-to-surface contact. The foraminous walls 24, 26 of the structure of FIGURES 1 and 2 may also be distensible to accomplish a similar objective.

FIGURE 5 shows a further modification of the invention wherein the accumulator member, indicated as 52, is guided in its movement in sleeve 54 by guide member 56. The accumulator member 52 has permeable walls 58 disposed adjacent the guide or rod 56. The clearances between the walls 58 and the rod 56 are less than the clearances between the outer extremities of the member 52 and the sleeve 54 so that there is no possibility of engagement between the two. Upon relative movement of the accumulator member 52 with respect to the sleeve 54, fluid is accumulated under pressure in chamber portions 60. The fluid passes through permeable walls 58 to provide a lubricating film between the latter walls and the rod 56.

FIGURE 6 shows another modification of the invention wherein the accumulator member, indicated as 62, is similar to the corresponding member of the embodiment shown in FIGURE 5. The accumulator 62 is shown as movable horizontally. Ends 63, 64 of the member 62 are closed. Each end incorporates a check valve 65, 66 for permitting entry of fluid therethrough during movement of the member 62 in sleeve 70. The lubricating film producing action of this arrangement is similar to that of the previously described embodiments of the invention.

An endless seal 67 may be provided about the periphery of the accumulator 62 to form a fluid seal between the accumulator 62 and the guide 70. The endless seal may be of the well known V-shaped configuration which expands in the presence of fluid pressure is suitable to prevent fluid leakage between these two members. A second endless seal 68 may be provided at the other end of the accumulator 62.

FIGURE 7 illustrates another modification of the invention wherein the permeable walls 24, 26 of the accumulator 18 are impregnated with a lubricant 71 of a solid or liquid medium. As the fluid is accumulated in the chamber 27 the pressure of the fluid passing through the walls 24, 26 forces the impregnated lubricant 71 into the space between the members 18, 10 to provide practically instantaneous lubrication of the opposing surfaces on the members.

In FIGURES 8 and 9 a further modification of the invention is disclosed. In this modification a plurality of shallow recesses 72 are provided. These recesses have a substantial circumferential extent about the periphery of the accumulator which is here indicated as 73. An accumulating chamber 74 is provided. Metering orifices 75 are formed to connect the chamber 74 and the recesses 72. In this modification fluid under pressure is accumulated in the chamber 74 and then passed through the orifices 75 into the recesses 72. The fluid escaping from the recesses forms a fluid film between the casing 10 and the accumulator 73 which is similar in consistency and function to the film formed in the other disclosed embodiments.

Alternately, the recesses 72 may be eliminated and further holes 75 may be added if the load imposed on the accumulator is sufficient to require additional fluid to form a supporting film. Additionally, a check valve may, of course, be provided at one or both ends of the accumulator 73 to perform a function comparable to the check valves employed in the previously disclosed embodiments.

There has thus been described a mechanism comprising an element movable relative to another element in close surface-to-surface relationship, novel means for providing effective lubrication of the relatively moving parts and wherein the movable element includes a foraminous portion in communication with means for supplying a pressurized fluid which portion defines a bearing extremity of the movable element whereby fluid is caused to flow through the foraminous portion to provide a lubricating film between the closely opposing bearing surfaces of the elements of the mechanism to minimize friction and to eliminate wear therebetween.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A piston for use in a gas actuated mechanism comprising, a tubular body having first and second ends and a gas accumulating cavity therebetween, said body including wall means defining at least one radial extremity of said cavity, said wall means including a gas compensating foraminous wall portion having an outer guided surface and means for the pressure compensating passage of gas from the cavity through the guided surface in sufficient quantity to generate a load carrying gas film to hold the piston out of contact with a guide, at least one of the body ends being a pressure end, and said one body end including an inlet passage for the conduction of gas from an adjacent pressure chamber to said cavity.

2. A mechanism comprising a tubular gas accumulator member and a guide member, the members being in spaced relationship when the mechanism is in operation, the accumulator having a foraminous wall and an internal cavity, the foraminous wall having a support surface and a cavity surface defining a portion of the cavity, the support surface being circumferentially disposed about the axis of the accumulator, the guide member having a guide surface disposed in spaced relationship with said support surface, said mechanism including means to define a pressure chamber, said accumulator having a work end defining one extremity of said cavity, said work end including an access opening connecting said cavity with said chamber to conduct gas under pressure from the chamber to the cavity, and said foraminous wall forming gas compensating means to permit a constant compensated flow of gas from the cavity through the wall to maintain the accumulator in spaced relationship with the guide and with the greatest flow occurring where the guide and support surfaces are spaced the greatest to maintain said guide and support surfaces out of contact when the mechanism is in operation.

3. A mechanism comprising a first member movable relative to a second member in closely spaced relationship, said second member having a guide surface defining the path of travel of said first member, the first member having a foraminous wall, the wall having a first smooth surface and a second surface, the first surface being circumferentially disposed about the axis of the first member and being spaced from said guide surface, gas accumulating means communicating with said second surface, means for supplying a gas under pressure to said accumulating means, said mechanism including means to define a pressure chamber, said first member having a work end defining one extremity of said chamber, said means for supplying gas under pressure including an access opening in the work end connecting said cavity with said chamber to conduct gas under pressure from the chamber to the cavity, and said foraminous wall forming gas compensating means to permit a constant compensated flow of gas from the cavity through the wall to maintain the members in spaced relationship and with the greatest flow occurring where the guide and support surfaces are spaced the greatest to maintain said guide and support surfaces out of contact when the mechanism is in operation.

4. A mechanism comprising a movable member having a cavity and a foraminous wall defining one extremity of said cavity, said wall having an external bearing surface, the wall foramina providing means to restrict communication between said surface and said cavity, another member defining a pressure chamber and a guide having a surface closely spaced from said bearing surface at points around the axis of the guide, said guide defining a path of travel for said member, and means to maintain a supply of gas under pressure to said cavity, and to cause said gas to pass through said restriction means to thereby create and maintain a total load supporting film of gas under reduced pressure between the bearing and guide surfaces to maintain the bearing and guide surfaces in spaced relationship when the device is in operation.

5. A piston and cylinder assembly comprising a movable piston member having a hollow cavity portion, the piston having a foraminous wall, the wall having an inner surface defining an extremity of said cavity portion and an outer surface defining an extremity of said piston, a guide member enclosing said piston member and having a guide surface in closely opposed relationship to said wall outer surface, said wall foramina providing means to restrict the flow of gas, and means for supplying gas under pressure to said cavity portion and to force gas through said restricting means into the space between the outer and guide surfaces to form and maintain a total load supporting lubricating film of gas between said surfaces and to maintain the surfaces out of contact when the assembly is in use.

6. The device of claim 1 wherein a check valve is disposed in said inlet passage to provide a unidirectional gas flow through said passage into said cavity.

7. A mechanism comprising a member having first and second end walls and a foraminous side wall therebetween, the walls defining an accumulating cavity, the side wall having a smooth outer support surface, a guide having a smooth inner guide surface in a close running fit with the wall support surface, said guide and said member being relatively movable, said mechanism including means to define a pressure chamber, one of said member end walls being a work end defining one extremity of said chamber, said work end including an access opening connecting said cavity with said chamber to conduct gas under pressure from the chamber to the cavity, and said foraminous wall forming gas compensating means to permit a constant compensated flow of gas from the cavity through the wall to hold said member in spaced relationship with said guide and with the greatest flow occurring where the guide and support surfaces are spaced the greatest to maintain said guide and support surfaces out of contact when the mechanism is in operation.

8. A mechanism comprising a movable member having a cavity and a foraminous wall defining one extremity of said cavity, said wall having an external bearing surface, the wall foramina providing means to restrict communication between said surface and said cavity, another member defining a pressure chamber and a guide having a surface closely spaced from said bearing surface at points around the axis of the guide, said guide defining a path of travel for said member, and said cavity being in communication with said pressure chamber to provide a means to maintain a supply of fluid under pressure in said cavity and to cause said fluid to pass through said restriction means to thereby create and maintain a total load supporting film of fluid under reduced pressure between the bearing and guide surfaces to maintain the bearing and guide surfaces in spaced relationship when the device is in operation.

9. A mechanism including a pair of relatively moving elements, one of said elements defining a cavity having a volume of gas, the other of said elements being movable in said cavity in close surface-to-surface relationship with said one element to define a space therebetween, said movable element having means for accumulating a portion of said gas under pressure and said movable element also having a foraminous wall forming means to restrict communication between said accumulated gas and the space between the closely opposing surfaces of said elements, such restriction means permitting said accumulated gas to flow through said wall to provide and maintain a load-supporting lubricating film of gas in the space between said elements to maintain said elements in spaced relationship.

10. The device of claim 8 wherein a lubricant is carried by and impregnates the foramina of the foraminous wall.

References Cited in the file of this patent

UNITED STATES PATENTS

| | | |
|---|---|---|
| 198,391 | Jamieson | Dec. 18, 1877 |
| 2,035,450 | Barnes | Mar. 31, 1936 |
| 2,336,240 | Gavin | Dec. 7, 1943 |
| 2,409,057 | Meinke | Oct. 8, 1946 |
| 2,495,516 | Foster | Jan. 24, 1950 |
| 2,610,096 | Mallory | Sept. 9, 1952 |
| 2,665,901 | Patterson | Jan. 12, 1954 |
| 2,696,410 | Topanelian | Dec. 7, 1954 |

FOREIGN PATENTS

| | | |
|---|---|---|
| 896,233 | France | Apr. 24, 1944 |